July 21, 1953 J. H. VICTOR 2,646,295
OIL SEAL CONSTRUCTION
Filed Aug. 26, 1950
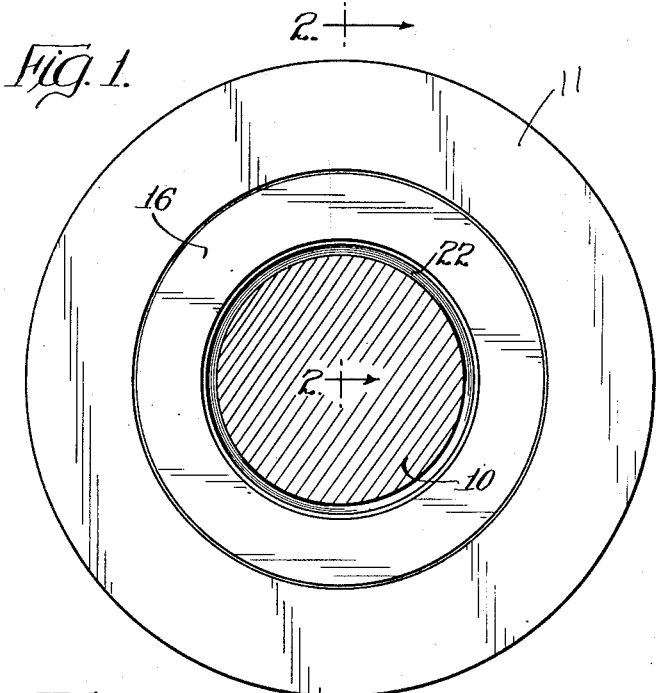
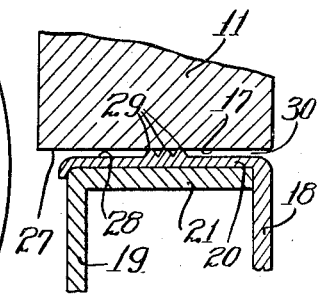
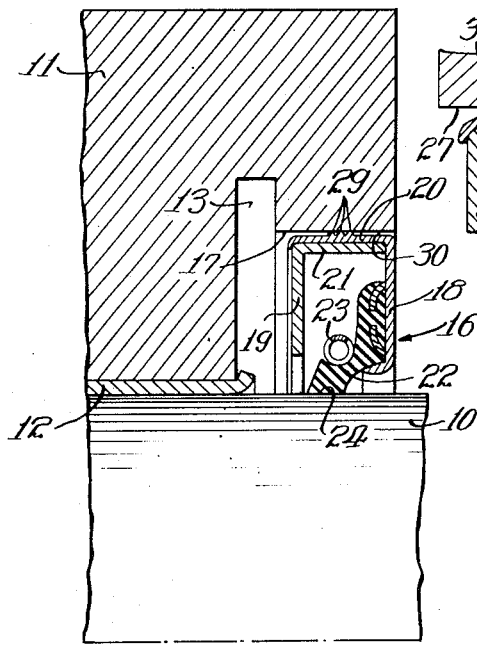
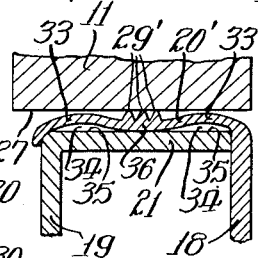
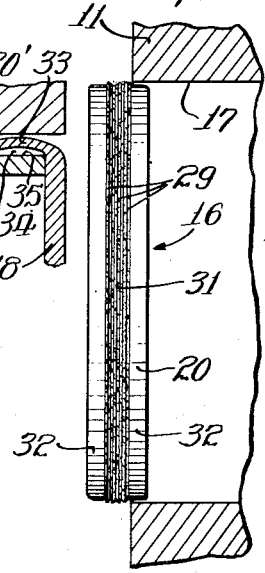
INVENTOR.
John H. Victor
BY
Attys:

Patented July 21, 1953

2,646,295

UNITED STATES PATENT OFFICE 2,646,295

OIL SEAL CONSTRUCTION

John H. Victor, Wilmette, Ill., assignor to Victor Manufacturing & Gasket Co., Chicago, Ill., a corporation of Illinois Application August 26, 1950, Serial No. 181,604

2 Claims. (Cl. 286—5)

This invention relates to oil seals for rotating or reciprocating shafts.

In oil seals heretofore used, which have a metal outer casing, it has been necessary to hold the tolerance of the outside diameter of the metal casing to very narrow limits. The reason for this is that the seal must be pressed into place within the bore being sealed. This press fit must be sufficient to be fluid tight, to hold the oil seal against rotation if it is sealing a rotating shaft, and to hold the oil seal in position if it is sealing a reciprocating shaft. It is also necessary that this press fit not be so tight that the structure of the oil seal itself is distorted since this might impair the function of the inner sealing member contacting the moving shaft. Further, the press fit must not be too tight or it may be impossible to remove the oil seal without damaging it or the bore in which it is positioned.

Accordingly, among the objects of this invention are. To provide for holding and sealing an oil seal for a rotating or reciprocating shaft in a bore in a simple, efficient and economical manner; to accomplish this without requiring that close tolerances be maintained between the bore and the seal housing; to provide integrally formed radial extensions for holding and sealing the housing in the bore; to provide the extensions in the form of annular serrations on the exterior of the housing or annular element of the seal; to pilot the oil seal into the bore; to bias the extensions radially outwardly; and to improve the sealing action by covering the serrations with a sealing compound which is held in position in the spaces therebetween.

Other objects of this invention will, in part, be obvious and in part appear hereinafter.

This invention is disclosed in the embodiment thereof shown in the accompanying drawing, and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following description together with the accompanying drawing, in which:

Figure 1 is a view in end elevation of a typical bearing housing construction in which the oil seal of the present invention is employed for sealing a shaft, the latter being shown in section;

Figure 2 is a detail sectional view at an enlarged scale taken generally along the line 2—2 of Figure 1 and showing a portion only of the bearing housing and oil seal;

Figure 3 is a sectional view at a greatly enlarged scale showing how the serrations effectively hold and seal the oil seal in position in the bore of the bearing housing;

Figure 4 is a view, somewhat diagrammatic in character, illustrating how the oil seal construed in accordance with the present invention is inserted in the bore of the bearing housing, the latter being shown in section; and Figure 5 is a view, similar to Figure 3, showing a modification of the invention.

Referring now to the drawing, it will be observed that the reference character 10 designates a shaft which may be either a rotatable shaft or a reciprocating shaft. The shaft 10 is movable in and through a bearing housing 11 in which there may be positioned a bearing sleeve 12 for engaging the surface of the shaft 10 as illustrated more clearly in Figure 2. Near one end of the housing 11 there is provided a conventional oil groove 13.

With a view to sealing the space between the movable shaft 10 and the bearing housing 11 an oil seal, indicated generally at 16, is employed. The oil seal 16 is of the general type disclosed in Victor Patent No. 2,468,247, issued April 26, 1949, and assigned to the assignee of this application.

The oil seal 16 is arranged to be located within a bore 17 of the bearing housing 11 the diameter of which is sufficiently greater than the diameter of the shaft 10 to accommodate the oil seal. The oil seal 16 includes an annular element or metallic outer channel section 18 and a metallic inner channel section 19. Preferably they are formed of steel and together the channel sections 18 and 19 form an annular housing. The outer channel section 18 includes an outer flange 20 which telescopes over an inner flange 21 that forms a part of the inner channel section 19. As shown, the flanges 20 and 21 have uniform diameters. Secured to the outer channel section 18 is a flexible sealing element 22 which, as disclosed in the patent above referred to, is composed of an oil or fluid resistant resilient material or elastomer such as compounded synthetic rubber or the like. A garter spring 23 extends around the flexible sealing element 22 and urges the sealing lip 24 into engagement with the surface of the movable shaft 10. While the details of construction of the oil seal 16 have been described with some particularity, it will be understood that oil seals having other details of construction can be employed in practicing the present invention.

As indicated hereinbefore, it has been customary to insert the oil seal 16 into the bore 17 in such a manner as to provide a press fit therebetween. More specifically the practice has been to provide the bore 17 with a cylindrical wall 27, Figure 3, the diameter of which has been such with respect to the outer cylindrical wall 28 of the annular element 18 that a press fit between these walls could be obtained. Obviously the required tolerances for this relationship are extremely critical. The cost involved in providing the cylindrical walls 27 and 28 so that they would have the desired relationship for making a press fit therebetween has been relatively high.

In some instances it has been the practice to coat the outer cylindrical wall 28 with a sealing compound in order to insure a tight seal between the walls 27 and 28. Because of the press fit between these walls, it has been extremely difficult to retain a sufficient amount of the sealing compound to provide the desired sealing action.

In accordance with this invention, instead of machining the cylindrical walls 27 and 28 so that a press fit can be had therebetween, they are machined to greater tolerances. Then one of the walls, preferably the outer cylindrical wall 28 is provided with annular serrations 29 which may be formed by a suitable tool so as to project a few thousandths of an inch beyond the outer cylindrical wall 28. In Figures 2 and 3 of the drawing the space 30 between the walls 27 and 28 is illustrated to a greatly exaggerated extent. Actually the outer cylindrical wall 28 fits relatively closely with the cylindrical wall 27 as shown more clearly in Figure 4. However, for illustrative purposes the space 30 has been illustrated in the manner described so that the function of the annular serrations 29 will be more readily apparent.

The dimensions of the walls 27 and 28 are such that the oil seal 16, provided with the annular serrations 29, can be readily inserted into one end of the bore 17 as shown in Figure 4. Thereafter the oil seal 16 is pressed further into the bore 17 until it occupies the position illustrated in Figures 2 and 3. When the oil seal 16 is placed in position in the manner described the outermost edges of the serrations 29 are somewhat flattened out as shown in Figure 3. In so doing they bite into the cylindrical wall 27 of the bore 17 and act not only to hold the oil seal 16 in place therein against rotary or translatory movement, but also they provide a metal to metal seal. The serrations 29 constitute lands and are so described in the claims appended hereto.

While three serrations 29 have been shown and described herein, it will be understood that a smaller or larger number can be used. The number of serrations 29 that is used will depend upon the width of the oil seal 16 and the specific application for which it is designed.

Where additional sealing is desired between the cylindrical walls 27 and 28, a sealing compound 31, Figure 4, can be employed. The sealing compound 31 may be a suitable synthetic rubber and it can be applied over the serrations 29 as a step in the manufacture of the oil seal 16. While the outermost portion of the sealing compound 31 may be scraped off when the oil seal 16 is pressed into position in the manner described in the bore 17, there still will remain some of the compound between the serrations 29.

The portions 32 of the cylindrical surface 28 on each side of the serrations 29 constitute piloting sections which register with the cylindrical wall 27 of the bore 17 and telescope therewith readily as shown in Figure 4 for a limited extent until the outermost serration is engaged. This accurately centers the sealing element 16 in the bore 17 so that, on subsequent application of pressure to force it into position, no cocking thereof takes place.

In Figure 5 of the drawing a modification of the invention is shown. Here the outer flange 20', corresponding to the flange 20 previously described, is centrally peripherally cupped slightly and generally upwardly curved portions 33 are formed the under sides of which are spaced a slight distance, as indicated at 34, from the surface 35 of the inner flange 21. The spacing at 34 is shown greatly exaggerated in the drawing. Preferably it is of the order of .005 to .010 inch, just sufficient to provide a resilient or biasing action acting outwardly of the central portion 36 which, as shown, engages the surface 35 when the inner flange 21 is telescoped therewith. After the cupping operation is performed, serrations 29' are formed by a suitable tool. While their outermost edges are aligned, they are of different lengths, i. e., the central serration is deeper than the outer serrations. When the oil seal, modified as shown in Figure 5, is inserted into the bore 17, the curved portions 33 act to pilot it into position in the manner described in which the portions 32 accomplish this function. After the seal is pressed into position the springing action of the cupped flange 20' improves the sealing with the wall 27 of the bore 17. As before the ends of the serrations 29' are flattened out to increase the sealing surfaces.

When the oil seal 16 is constructed as described herein with the annular serrations 29 or 29', it is more readily compressed into the bore 17 since the only portions of the metal which have to yield are the outer edges of the serrations 29 or 29' and the portions 33 of the flange 20' associated with the latter. These constructions provide a relatively great degree of flexibility and compensate for irregularities in the bore 17 if there are any. They eliminate the necessity for centerless grinding and burnishing. The construction of tools is simplified and it is possible to use commercial tolerances of steel. A further advantage is that the oil seal 16 when provided with annular serrations 29 or 29' can be removed more readily from the bore 17 than is the case when the construction is such that there is a conventional press fit between the cylindrical walls 27 and 28 in the absence of the serrations 29 or 29'.

Since further changes can be made in the foregoing construction and different embodiments of the invention can be made without departing from the spirit and scope thereof, it is intended that all matter shown in the accompanying drawing, and described hereinbefore shall be interpreted as illustrative and not in a limiting sense.

What is claimed as new is:

1. A sealing device for forming a fluid tight seal between a bore in a housing and a shaft that projects through that bore, comprising: a metallic cuplike shell consisting of a wave-shaped outer wall the crests of which are adjacent its ends and a valley of which lies between the crests, and a planar wall projecting radially inwardly from one end of said outer wall; a flexible sealing element fixed to said planar wall and projecting inwardly therefrom to engage the shaft and form a seal therewith; a plurality of ridges rising out of the valley in said outer wall and projecting radially outwardly beyond the apexes of the crests therein and adapted to be deformed by engagement with the bore in said housing to form a fluid tight seal therewith; and a reinforcing member comprising a cylindrical portion snugly engaging the inner surface of said outer wall and a radial portion extending inwardly from the end of the cylindrical portion away from said planar wall for strengthening the outer wall against distortion by the pressure placed thereupon by said ridges.

2. A sealing device for forming a fluid tight seal between a bore in a housing and a shaft that projects through that bore, comprising: a metallic cuplike shell consisting of a wave-shaped outer wall with the larger diameter portions located adjacent its ends, and a planar wall projecting radially inwardly from one end of the outer wall; a flexible sealing element fixed to said planar wall and projecting inwardly therefrom to engage the shaft and form a seal therewith; a plurality of ridges projecting radially outwardly from the smaller diameter portion of said outer wall at the center of said outer wall and extending beyond the larger diameter portions of said wall and adapted to be deformed by engagement with the bore in said housing to form a fluid tight seal therewith; and a reinforcing member comprising a cylindrical portion snugly engaging only the smaller diameter portion of said outer wall and a radial portion extending inwardly from the end of the cylindrical portion away from said planar wall for strengthening the outer wall against distortion by the pressure placed thereupon by said ridges.

JOHN H. VICTOR.

References Cited in the file of this patent

UNITED STATES PATENTS

| Number | Name | Date |
|---|---|---|
| 2,181,203 | Reynolds | Nov. 28, 1939 |
| 2,362,843 | Northrup | Nov. 14, 1944 |
| 2,447,411 | Helfrecht | Aug. 17, 1948 |
| 2,481,793 | Stewart | Sept. 13, 1949 |

FOREIGN PATENTS

| Number | Country | Date |
|---|---|---|
| 704,578 | Germany | of 1941 |